Oct. 26, 1965 J. MARTIN 3,214,258
BLANK MOLD MEANS WITH PNEUMATIC OPERATED PLUNGER
FOR FABRICATING SEAMLESS HIGH OPTICAL
QUALITY GLASS ARTICLES
Original Filed Oct. 30, 1959 4 Sheets-Sheet 1
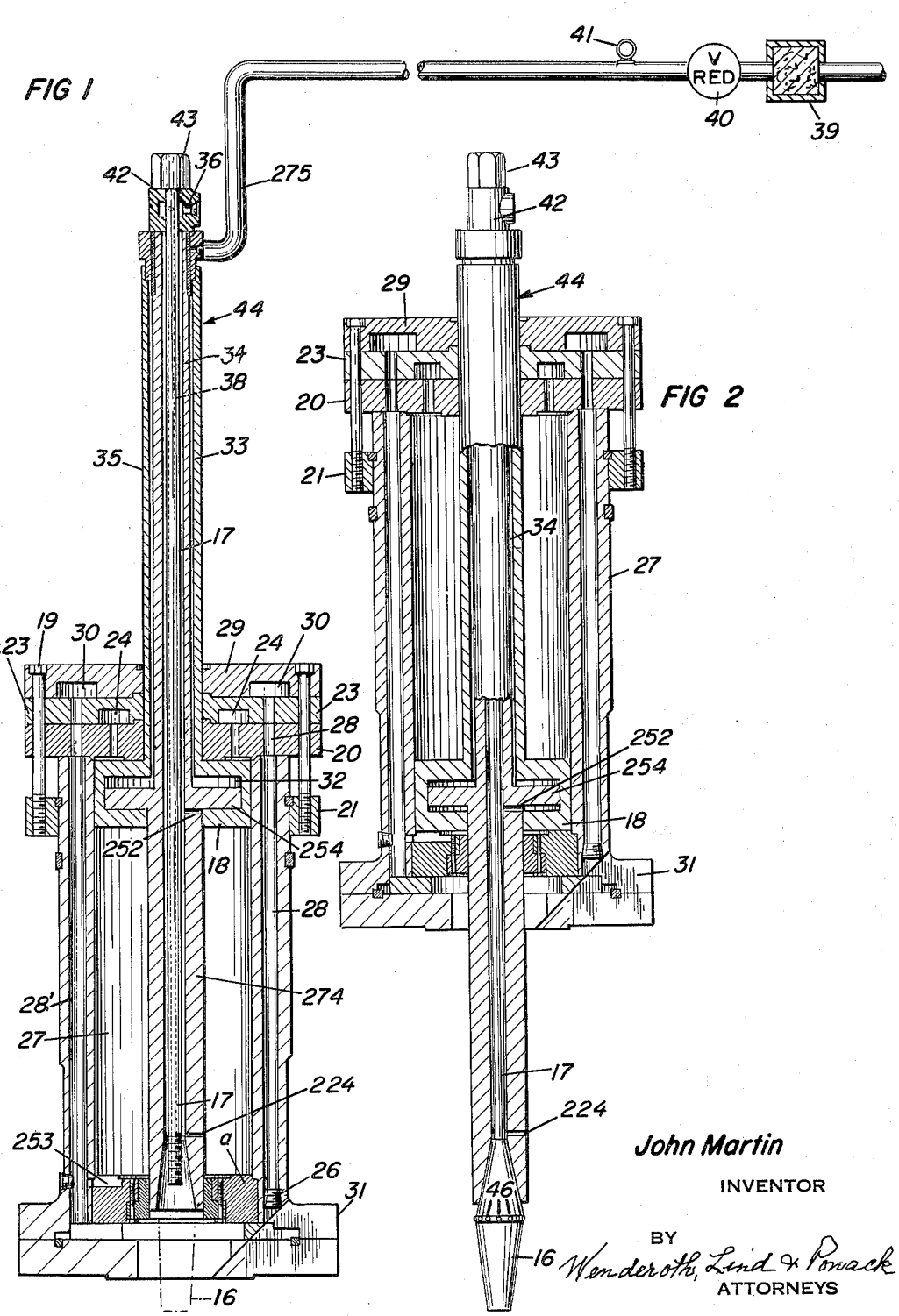
John Martin
INVENTOR
BY Wenderoth, Lind & Ponack
ATTORNEYS

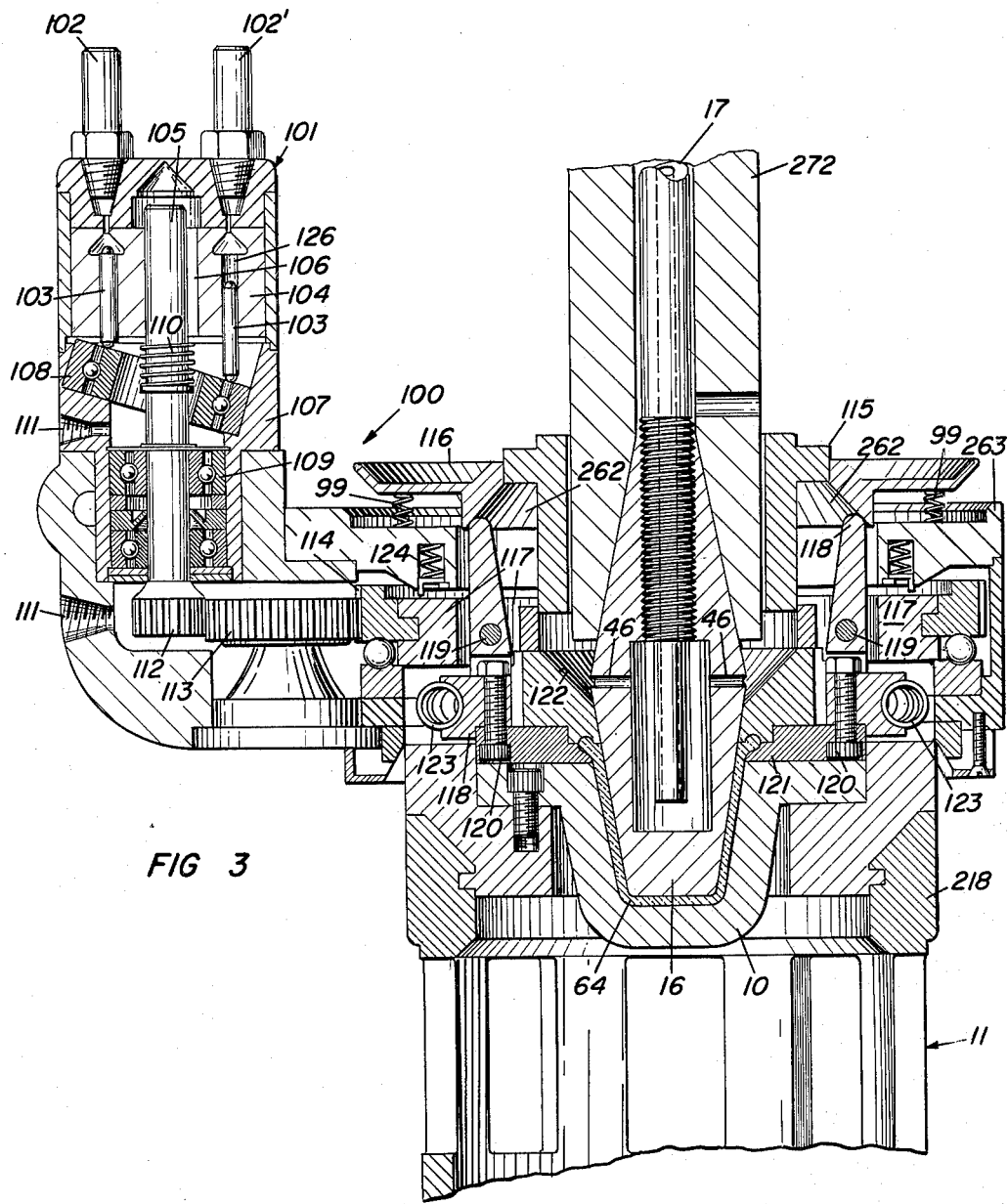

Oct. 26, 1965 J. MARTIN 3,214,258
BLANK MOLD MEANS WITH PNEUMATIC OPERATED PLUNGER
FOR FABRICATING SEAMLESS HIGH OPTICAL
QUALITY GLASS ARTICLES
Original Filed Oct. 30, 1959 4 Sheets-Sheet 3
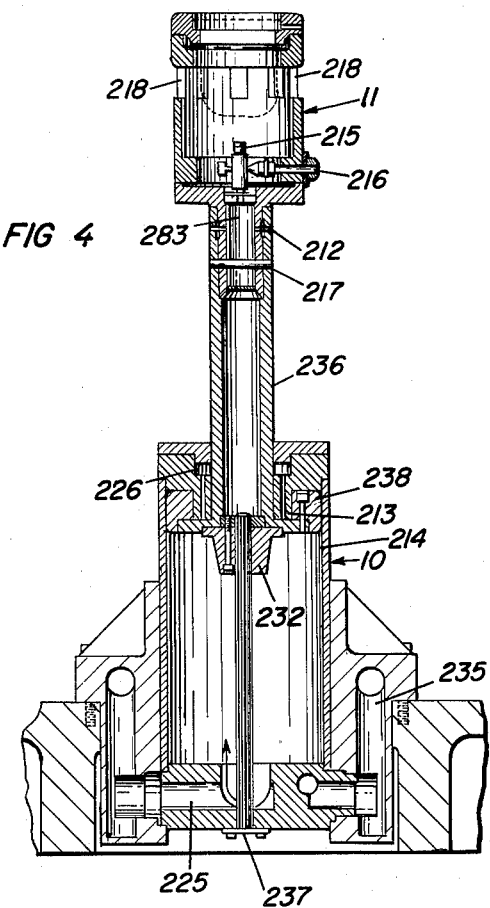
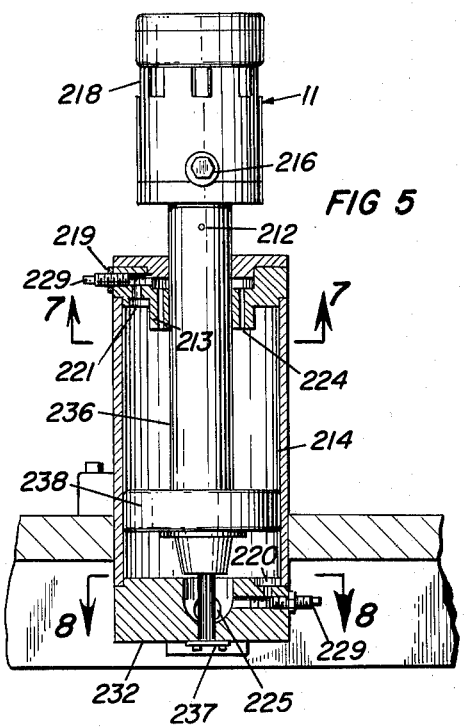
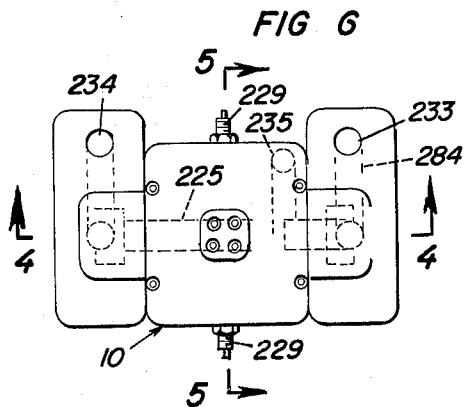
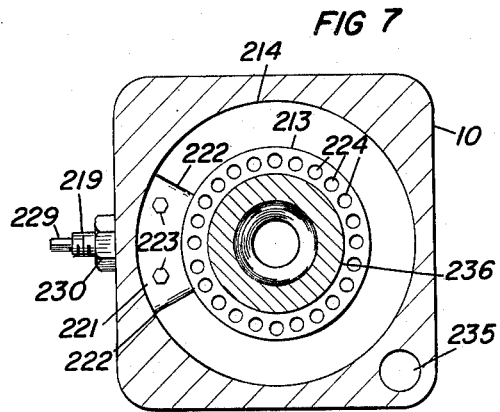
John Martin
INVENTOR
BY
Wenderoth, Lind & Ponack
ATTORNEYS

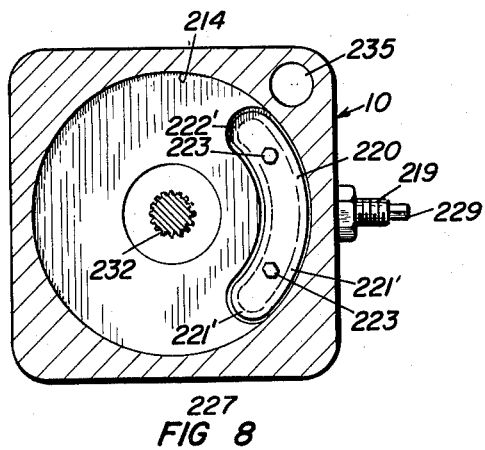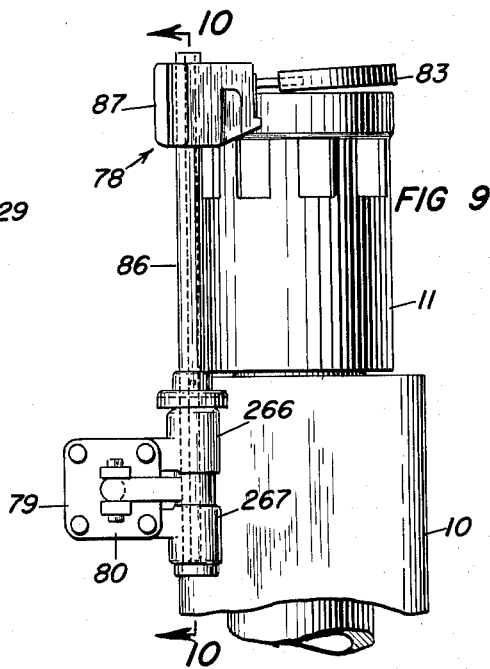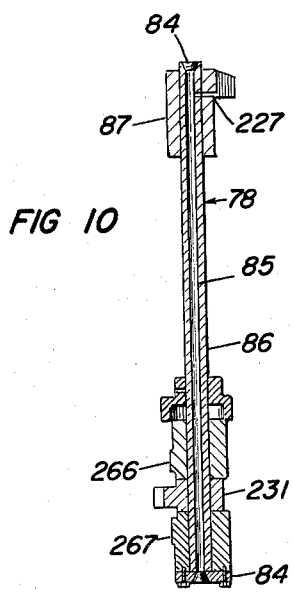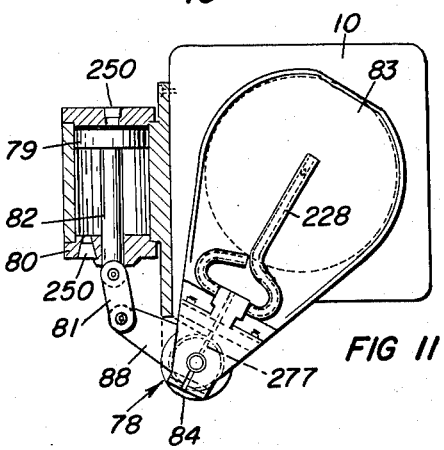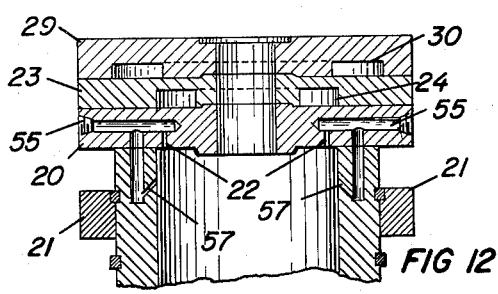
John Martin
INVENTOR

United States Patent Office 3,214,258
Patented Oct. 26, 1965

---

3,214,258
BLANK MOLD MEANS WITH PNEUMATIC OPERATED PLUNGER FOR FABRICATING SEAMLESS HIGH OPTICAL QUALITY GLASS ARTICLES
John Martin, Monterrey, Nuevo Leon, Mexico, assignor to Fabricacion de Maquinas, S.A., Monterrey, Nuevo Leon, Mexico
Original application Oct. 30, 1959, Ser. No. 849,928, now Patent No. 3,142,552, dated July 28, 1964. Divided and this application Sept. 30, 1963, Ser. No. 312,376
Claims priority, application Mexico, Apr. 5, 1952, 52,091
3 Claims. (Cl. 65—318)

This application is a division of my application Serial No. 849,928 filed October 30, 1959 now Patent No. 3,142,552 granted July 28, 1964.

The present invention relates to a pneumatically operated plunger for fabricating seamless high optical quality glass articles which may be used with various types of blank mold means.

An object of the invention is to provide pneumatic means to replace the usual spring means cooperating with the plunger for forming the pre-form of a glass article in a blank mold.

A further object of the invention is to provide means for applying a plunger to form a pre-form of the glass article in a blank mold at a desired pressure with a pneumatic cushion action.

A still further object of the invention is to provide a construction whereby the pressure of the plunger in forming a pre-form may be changed at any time without stopping the operation of the machine.

A still further object of the invention is to provide means whereby the extent of movement of the parts involved is held at a minimum.

With the above and other objects in view which will become apparent from the following description and claimed in the claims, a preferred form of construction is shown in the drawings, in which:

FIGURE 1 is a cross-sectional view with parts in elevation of a plunger construction for applying the pressure for forming a pre-form in a blank mold with the piston in its uppermost position.

FIGURE 2 is a cross-sectional view with parts in elevation of the plunger shown in FIGURE 1 with the piston in its lowermost position.

FIGURE 3 is a partial cross-sectional view illustrating the neck ring mechanism and the hydraulic motor for rotating the same together with the formation by the plunger of the pre-form.

FIGURE 4 is a cross-sectional view of the blank mold construction with its retaining basket and the means for operating the same taken upon section line 4—4 of FIGURE 6 with the piston in its uppermost position.

FIGURE 5 is a view of the construction shown in FIGURE 4 with parts shown in elevation taken upon section line 5—5 of FIGURE 6.

FIGURE 6 is a bottom plan view of the construction shown in FIGURE 4.

FIGURE 7 is a cross-sectional view taken upon section line 7—7 of FIGURE 5 looking in the direction of the arrows.

FIGURE 8 is a cross-sectional view taken upon section line 8—8 of FIGURE 5 looking in the direction of the arrows.

FIGURE 9 is an elevational view illustrating particularly the means for covering the blank mold in order to protect the same from drippings, etc.

FIGURE 10 is a cross-sectional view taken upon section line 10—10 of FIGURE 9.

FIGURE 11 is a top plan view of the construction shown in FIGURE 10 with certain parts shown in section, and FIGURE 12 is a cross-sectional view of the top portion of the cylinder for the plunger of FIGURE 1 illustrating particularly the various ports for the air pressure.

In the various figures of the drawings, like reference numerals are used to indicate like parts.

A metered gob of molten glass is supplied to a blank mold indicated generally at 10 in any desired manner.

The plunger mechanism indicated generally at 44 for actuating the plunger 16 in order to form the pre-form in the blank mold 10 is shown particularly in FIGURES 1, 2 and 3.

The plunger mechanism comprises a cylinder 27 in which a piston 18 is reciprocal. The piston 18 at its upper portion is fixed to a hollow shaft 35. The piston 18 is itself hollow, as shown, forming the air cushioning space 32 in which the free floating piston 254 upon hollow shaft 34 is positioned. Within hollow shafts 34 and 35, passing through both pistons is the plunger head shaft 17 to which the plunger head 16 is attached.

The piston 18 may be move downwardly by the hollow shaft 35 when air enters the ports 55 as shown more particularly in FIGURE 12. When piston 18 moves downwardly it carries with it piston 254. The pressure in the air space 32 is supplied through the passage 33 existing between the hollow shafts 35 and 34. This pressure is regulated by means of a reduction valve 40 and a manometer 41 upon the line 275 from a suitable air supply. The piping 275 is sufficiently long to serve as an accumulator. The volume of such piping is sufficiently large so that the pressure increase is negligible when it absorbs the backward flow of the air displaced by the plunger. 39 is a filter. By this control of the air cushion 32 it will be seen that the pressure existing in the cushioning space 32 may be adjusted even while the machine is operating.

Ordinarily the pressure of air in order to move the entire mechanism is from 30 to 60 pounds per square inch but the controlled air pressure within the cushioned space 32 is only from a few ounces to about 10 pounds per square inch. This pressure operation is an exceedingly delicate operation and must be accomplished with the utmost accuracy. The pressure for small tumblers for instance is about 5 ounces while for larger tumblers the pressure may be four of five pounds. This is because the various molds used are not exactly the same. As a general rule the operation is carried out with the lowest pressure possible. If it were necessary to stop the machine in order to correct the pressure to be applied by the plunger then the plunger would cool and such plunger should ordinarily have a rather high temperature. In order to move the piston 18 upwardly air is admitted into the passage 26 and from thence through the bores in the casting 28 to an annular groove 30 and from there downwardly through the bore 28' and into a passage 253 located at the bottom of the cylinder 27.

The shaft 34 is provided as mentioned above at its lower end with a piston 254 which forms a part of the cushioning means. The rod 17 to which the plunger 16 is attached is provided with a central bore 38 which communicates on one hand with the air inlet 36 and on the other hand with the outlet ports 46 provided upon the plunger head 16. This constitutes the cooling air for the plunger. A cap nut is indicated at 43 and is seated upon the air admission collar 42. The top plate of the cylinder is shown at 29 with the intermediate head plate 23. The bottom head plate is shown at 20 and by the various ports and annular passages the conduits for the air are provided.

A head assembly ring is shown at 21 and a cooling air inlet collar at 42. The hollow shaft 34 carrying the piston 254 is provided at its lower end with a bleed hole 224 and an additional bleed hole 252 for the space below the plunger 254 in order to allow air to escape and not to build up a counter pressure, preventing downward movement of the piston 254 due to cushion pressure in the space 32.

The bleed holes prevent equalization of air pressure at each side of the piston 254 and thereby allow a more accurate pressure to be maintained in air cushion 32. They also remove condensed water and oil.

In FIGURE 3 the neck ring mechanism together with the cooperating elements is shown. The hydraulic motor indicated generally at 101 comprises a shaft 105, and a collar 104 fixed to the shaft by a key 106. The collar 104 is provided with a plurality of spaced bores 126 in which are located the pins 103. The pins are slidably mounted in the bores and there are fluid inlets 102 and 102' which communicate with the bores 126.

In the housing 107 there is provided an inclined plane 108 in the form of a ball bearing. If fluid under pressure is admitted to inlet 102 and evacuated from 102' the pin 103 directly under the inlet 102 will be forced downwardly along the inclined plane 108. A pin 103 which is under 102' will be moved upwardly along the inclined plane 108. Since there are a plurality of these pins as long as pressure is applied as indicated the collar 104 will be rotated and the shaft 105 will also be rotated. A reverse rotation of the shaft may also be accomplished by reversing the pressure and evacuation applied to the pins 103. Also by a suitable control of the hydraulic pressure applied the shaft 105 may be rotated alternately clockwise and counterclockwise and thereby bring about a similar rotation of the neck ring. Lubricating inlets are shown at 111 and the shaft 105 is mounted in ball bearings 109.

At the lower end of the shaft 105 there is fixed a gear 112 which meshes with the idle gear 113. The idle gear 113 meshes with a ring gear 114 which transmits motion to a ring 117 which is an internally bifurcated torus. In FIGURE 11 the ring 117 is indicated in dotted lines. The bifurcations of the ring 117 serve as bearing points for the shafts 119 upon which the pivoting neck ring release arms 118 pivot. The neck ring 121 is secured to the pivoting arms 118 by the bolts 120. This construction as shown is located below the blow head seat 115 and the neck ring release ring 116. When the ring 116 is depressed by any suitable mechanism the springs 99 are compressed and the neck ring pivoting arms 118 will slide upwardly upon the inclined surface 262 provided at the lower side of the ring 116. The springs 99 act as return springs for returning the ring 116 to the position shown in FIGURE 3 upon release of the pressure upon the ring 116.

The gear 114 is fixed to the ring 117 and a coil spring 123 encircles the lower portion of the neck ring release arms 118. The spring 123 acts as a return spring for returning the arms 118 to the position shown in FIGURE 3 upon upward movement of the release ring 116. The inward action of the arms 118 upon the neck ring 121 is restrained by the contact of the neck ring with the neck ring guide 122 when such ring is positioned in its normal operating position.

Referring to FIGURES 4, 5, 6, 7 and 8 the blank mold retaining basket is indicated generally at 11. This is secured to the top of a tubular piston shaft 236. The bottom of the basket is provided with a tubular stem 283 which fits within the tubular shaft 236 and is secured thereto by means of a pin 217. The stem 283 and the shaft 236 is provided with air inlets 212 for the cooling air for the bottom of the blank mold. Cooling air enters at the inlet 216 and the basket is provided with outlet windows 218 for the exit of the cooling air.

At the lower end of the tubular shaft 236 there is provided a piston 238. Referring to FIGURE 6 air inlets 233 and 234 are provided for moving the piston upwardly and downwardly in the cylinder 214. As shown by the flow lines in FIGURE 4 air for moving the piston 238 upwardly is admitted at 234 and passes through channel 225 to the lower side of piston 238. The air for lowering the piston is admitted at inlet 233 and passes through the channel 284 to the passage 235 in the casing 10 and from there to the annular channel 226 at the top of cylinder 214 from which it passes through the outlets 224 in the annular flange 213 at the upper portion of the cylinder 214. Means for adjusting the air escape from the cylinder is shown at 219.

In order to cushion the action of the piston 238 there is provided a sheet metal check valve both at the top and at the bottom of the cylinder 214. The check valve at the top is shown at 221 and the check valve at the bottom of the cylinder is shown at 220. The means for adjusting the escape of air is indicated at 219 with a square end 229 for manipulating the same.

The construction of the check valve 220 is shown more particularly in FIGURE 8 and comprises a sheet metal strip 221' with a bend 222' therein. The upper check valve 221 is provided with a bend 222 as shown in FIGURE 7. 223 indicates the bolts for securing the check valves to the casting 10. At 215 there is shown a cooling air control cock.

FIGURES 9, 10 and 11 show the construction for providing a covering mechanism and air inlet for the blank mold indicated generally at 78. The mechanism comprises a piston 79 reciprocating in a cylinder 80. The piston rod 82 is connected by a link 81 to a link 88 which in turn is connected by a hub 231 to a hollow rod 86 having an air passage 85 extending axially therethrough. At 266 and 267 holding means are provided for the rod 86 which are mounted on a fixed part of the frame. When the piston 79 is moved in one direction or the other by air through one of the ports 250 the links 81 and 88 will rotate the rod 86 and this rotation is transmitted to the clamping means 87 fixed at the top of the rod 86. Mounted upon the clamping means is a cover 83 of the form more particularly shown in FIGURE 11. The cover 83 is normally tilted as shown in FIGURE 9 so that any stray water or foreign material that may happen to fall thereon will be deflected from it rather than fall into the blank mold basket 11. In addition, the air passage 85 provides cleaning air for the basket which passes from the passage 85 through the passage 227 into the passage 228 provided on the cover 83 and thence downwardly through an opening into the basket 11 and consequently to the blank mold.

A splined rod 237 see FIG. 4 is secured to the base of the cylinder 214 and extends upwardly passing through a plug 232 fixed by means of a screw to the bottom of the piston 238. This rod 237 is designed to prevent any rotation of the mechanism about its axis in order to arrest any tendency to rotate the basket.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A blank mold and plunger for a machine for making seamless glass articles of high optical quality comprising an exterior cylinder body, a first hollow movable piston with a closed tubular extension extending through the top portion of said exterior cylinder body, a free floating hollow piston movable within said hollow cylinder portion of said first hollow piston having a hollow plunger stem with a plunger attached extending through said first hollow piston and the bottom portion of said exterior cyinder body for movement into a blank mold, means for reciprocating said first hollow piston and said enclosed free floating piston into said blank mold, means on the upper hollow tubular extension of said first hollow piston above said free floating piston for adjusting the air pressure to cushion the movement of said free floating hollow piston into the blank mold.

2. A blank mold and plunger as set forth in claim 1 wherein a rod is provided within said free floating piston to support said plunger on said stem within said free floating hollow piston.

3. A blank mold and plunger as set forth in claim 1 wherein said means on said upper hollow tubular extension comprises a pipe and a reduction valve is mounted on said pipe to regulate the pressure in said air cushion.

References Cited by the Examiner
UNITED STATES PATENTS

| | | | |
|---|---|---|---|
| 1,027,567 | 5/12 | Schies | 65—31 |
| 1,466,867 | 9/23 | Winder | 65—318 |
| 1,529,661 | 3/25 | Miller | 65—231 |
| 2,011,980 | 8/35 | Miller | 65—314 |
| 2,146,346 | 2/39 | Nelson | 65—314 |
| 2,837,872 | 6/58 | Brymer | 65—318 X |

DONALL H. SYLVESTER, *Primary Examiner.*